(12) United States Patent
Duan

(10) Patent No.: US 12,425,811 B2
(45) Date of Patent: Sep. 23, 2025

(54) METHOD AND APPARATUS FOR JOINING MULTICAST BROADCAST SERVICE (MBS) SESSION

(71) Applicant: DATANG MOBILE COMMUNICATIONS EQUIPMENT CO., LTD., Beijing (CN)

(72) Inventor: Xiaoyan Duan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 407 days.

(21) Appl. No.: 17/923,914

(22) PCT Filed: May 13, 2021

(86) PCT No.: PCT/CN2021/093586
§ 371 (c)(1),
(2) Date: Nov. 8, 2022

(87) PCT Pub. No.: WO2021/233196
PCT Pub. Date: Nov. 25, 2021

(65) Prior Publication Data
US 2023/0179959 A1 Jun. 8, 2023

(30) Foreign Application Priority Data
May 22, 2020 (CN) .......................... 202010441153.5

(51) Int. Cl.
*H04W 4/06* (2009.01)
*H04W 60/04* (2009.01)
*H04W 76/10* (2018.01)

(52) U.S. Cl.
CPC ............. *H04W 4/06* (2013.01); *H04W 60/04* (2013.01); *H04W 76/10* (2018.02)

(58) Field of Classification Search
None
See application file for complete search history.

(56) References Cited

U.S. PATENT DOCUMENTS

2019/0158985 A1 5/2019 Dao et al.
2020/0092923 A1 3/2020 Abraham et al.
(Continued)

FOREIGN PATENT DOCUMENTS

CN 101656615 A 2/2010
CN 110169104 A 8/2019
(Continued)

OTHER PUBLICATIONS

3GPP TR 23.757 V0.3.0. 3rd Generation Partnership Project; Technical Specification Group Services and System Aspects; Study on architectural enhancements for 5G multicast-broadcast services (Release 17), total 37 pages, Jan. 2020.
(Continued)

*Primary Examiner* — Walter J Divito
(74) *Attorney, Agent, or Firm* — KILPATRICK TOWNSEND & STOCKTON LLP

(57) ABSTRACT

The method for joining a multicast broadcast service (MBS) session includes: receiving, by the network device, MBS information sent by a User Equipment, UE; determining according to the MBS information, by the network device, information of a first Session Management Function, SMF, that currently serves an MBS session corresponding to the MBS information; and sending, by the network device, the MBS information to the first SMF according to the information of the first SMF, so that the first SMF handles the UE joining into the MBS session. In this way, the network device obtains the SMF that currently serves the MBS session by querying, so that one MBS session is only served by one SMF, avoiding the situation that SMFs serve the
(Continued)

same MBS session, and simplifying the MBS session management.

18 Claims, 7 Drawing Sheets

(56) References Cited

U.S. PATENT DOCUMENTS

| | | | | |
|---|---|---|---|---|
| 2020/0128450 | A1* | 4/2020 | Wang | H04W 8/14 |
| 2023/0026061 | A1* | 1/2023 | Liu | H04W 48/16 |
| 2023/0081145 | A1* | 3/2023 | Godin | H04L 12/185 |
| | | | | 370/312 |

FOREIGN PATENT DOCUMENTS

| | | |
|---|---|---|
| CN | 110366131 A | 10/2019 |
| CN | 110661638 A | 1/2020 |
| CN | 110972078 A | 4/2020 |
| WO | 2019114939 A1 | 6/2019 |
| WO | 2019137546 A1 | 7/2019 |
| WO | 2019157942 A1 | 8/2019 |
| WO | 2020035129 A1 | 2/2020 |
| WO | 2020061347 A1 | 3/2020 |
| WO | 2020071847 A1 | 4/2020 |

OTHER PUBLICATIONS

Ericsson, "Solution 2 update", SA WG2 Meeting #138E, Electronic, Jun. 1-12, 2020, total 14 pages, S2-200xxxx (Revision of S2-200xxxx).
Qualcomm Incorporated et al., "Solution: Integrated Multicast and Unicast Transport with Full Separation of MBS Service", SA WG2 Meeting #136-AH, Incheon, South Korea, Jan. 13-17, 2020, total 7 pages, S2-2001705(e-mail revision 4 of S2-2001543).
CATT,"KI #1, New Sol: MBS session joining via PDU session establishment and modification procedures", SA WG2 4 Meeting #S2-139E, Jun. 1-12, 2020, Elbonia, total 7 pages, S2-2004176.

* cited by examiner

METHOD AND APPARATUS FOR JOINING MULTICAST BROADCAST SERVICE (MBS) SESSION

CROSS-REFERENCE OF RELATED APPLICATIONS

The present application is a national phase entry under 35 U.S.C. § 371 of International Application No. PCT/CN2021/093586, filed on May 13, 2021, which claims the priority of Chinese Patent Application No. 202010441153.5, filed with the China National Intellectual Property Administration on May 22, 2020 and entitled "Method and Apparatus for Joining Multicast Broadcast Service (MBS) Session", the entire content of which is hereby incorporated by reference.

FIELD

The present application relates to the field of wireless communication technologies, and provides a method and apparatus for joining a Multicast Broadcast Service (MBS) session.

BACKGROUND

The Fifth Generation Mobile Networks (5G) support the Multicast Broadcast Service (MBS), to implement data transmission of Internet Protocol Version 4 (IPv4)/Internet Protocol Version 6 (IPv6) multicast/broadcast, Internet Protocol Television (IPTV) and other services, or optimize the transmission efficiency and the network resource usage efficiency of group communication, Internet of things (IoT) communication, Vehicle to Everything (V2X) communication and other services. In order to realize the above functions, the 5G need to join a User Equipment (UE) with the MBS requirement into the MBS session.

According to the third Generation Partner Project (3GPP) standard, the Access and Mobility Management Function (AMF) receives a request message sent by the UE to join the MBS session, and selects the Session Management Function (SMF) serving the Protocol Data Unit (PDU) session and MBS session for the UE, so that the UE can join the MBS session and receive the MBS data sent by the User Plane Function (UPF) through the PDU session channel.

However, the use of the above method to join the MBS session will cause the following problem: when different AMFs receive request messages sent by UEs to join a same MBS session, different AMFs may choose different SMFs and join the corresponding UEs into the same MBS session, and then SMFs serve the same MBS session, so that the management of the MBS session is complicated and even the MBS data cannot be sent to the UEs normally.

In view of this, the embodiments of the present application provide a new method for joining an MBS session.

BRIEF SUMMARY

Embodiments of the present application provide a method and apparatus for joining an MBS session, to solve the problem of complex MBS session management.

Some embodiments of the present application provide a method for joining an MBS session, performed by a network device. The method includes:
receiving, by the network device, MBS information sent by a UE;
determining, by the network device, information of a first SMF that currently serves an MBS session corresponding to the MBS information according to the MBS information; and
sending, by the network device, the MBS information to the first SMF according to the information of the first SMF, so that the first SMF handles the UE joining into the MBS session.

In one embodiment, the network device is an AMF.
The receiving, by the network device, the MBS information sent by the UE, includes:
receiving, by the AMF, a first request message including the MBS information sent by the UE; or
receiving, by the AMF, a second request message including the MBS information sent by a second SMF.
The second SMF is an SMF serving a PDU session of the UE.

In one embodiment, the network device is a second SMF. The second SMF is an SMF serving a PDU session of the UE.
The receiving, by the network device, the MBS information sent by the UE, includes:
receiving, by the second SMF, a third request message including the MBS information sent by a UPF.
The third request message is generated by the UPF based on the MBS information sent by the UE through the PDU session.

In one embodiment, the determining, by the network device, the first SMF that currently serves the MBS session corresponding to the MBS information according to the MBS information, includes:
sending, by the network device, a fourth request message including the MBS information to an NRF to query the NRF for the first SMF that currently serves the MBS session corresponding to the MBS information; and
receiving, by the network device, the information of the first SMF sent by the NRF.

In one embodiment, the fourth request message includes first information that includes some or all of:
network slice information, a data network name, a public land mobile network identifier, service area information.

In one embodiment, if the first SMF that currently serves the MBS session corresponding to the MBS information does not exist, the method further includes:
sending, by the network device, the MBS information to a third SMF according to information of the third SMF provided by the NRF, so that the third SMF handles the UE joining into the MBS session.
The third SMF has an MBS capability.

In one embodiment, the network device is the AMF.
The sending, by the network device, the MBS information to the first SMF according to the information of the first SMF sent by the NRF, includes:
sending, by the AMF, the MBS information to the first SMF according to the information of the first SMF if a service area of the first SMF includes an area where the UE is located; or
sending, by the AMF, the information of the first SMF and the MBS information to an intermediate SMF if a service area of the first SMF does not include an area where the UE is located, so that the intermediate SMF sends the MBS information to the first SMF according to the information of the first SMF.
A service area of the intermediate SMF includes the area where the UE is located.

In one embodiment, the network device is a second SMF.

The sending, by the network device, the MBS information to the first SMF, includes:

sending, by the second SMF, the information of the first SMF and the MBS information to an AMF, so that the AMF sends the MBS information to the first SMF.

In one embodiment, the MBS information includes some or all of:

an MBS multicast address, a temporary mobile group identity, an MBS session identifier.

Some embodiments of the present application further provide a method for joining an MBS session, performed by an NRF. The method includes:

receiving, by the NRF, MBS information sent by a network device;

determining, by the NRF, a first SMF according to the MBS information and stored SMF information, wherein the first SMF is an SMF that currently serves an MBS session corresponding to the MBS information; and providing, by the NRF, information of the first SMF to the network device, so that the network device handles a UE joining into the MBS session through interactions with the first SMF.

In one embodiment, the method further includes:

providing, by the NRF, information of a third SMF with an MBS capability to the network device if there is no SMF currently serving the MBS session corresponding to the MBS information, so that the network device handles the UE joining into the MBS session through interactions with the third SMF.

In one embodiment, before the NRF receives the MBS information sent by the network device, the method further includes:

receiving, by the NRF, a fifth request message sent by the first SMF, wherein the fifth request message is used to register or update the information of the first SMF, and the information of the first SMF includes information of the MBS session.

Some embodiments of the present application further provide a method for joining an MBS session, performed by an SMF. The method includes:

registering or updating, by the SMF, information of the SMF with an NRF when configuring or establishing an MBS session, wherein the information of the SMF includes information of the MBS session, so that the NRF provides the information of the SMF that currently serves the MBS session to a network device.

In one embodiment, the method further includes:

requesting, by the SMF, the NRF to update the information of the SMF when releasing the MBS session, wherein updating the information of the SMF includes: deleting the information of the MBS session from the information of the SMF.

Some embodiments of the present application further provide an apparatus for joining an MBS session, which is applied to a network device and includes:

a receiving device, configured to receive MBS information sent by a UE;

a querying device, configured to determine information of a first SMF that currently serves an MBS session corresponding to the MBS information according to the MBS information;

a processing device, configured to send the MBS information to the first SMF according to the information of the first SMF, so that the first SMF handles the UE joining into the MBS session.

In one embodiment, the network device is an AMF;

when receiving the MBS information sent by the UE, the receiving device is configured to:

receive a first request message including the MBS information sent by the UE; or receive a second request message including the MBS information sent by a second SMF, wherein the second SMF is an SMF serving a PDU session of the UE.

In one embodiment, the network device is a second SMF, wherein the second SMF is an SMF serving a PDU session of the UE;

when receiving the MBS information sent by the UE, the receiving device is configured to:

receive a third request message including the MBS information sent by a UPF, wherein the third request message is generated by the UPF based on the MBS information sent by the UE through the PDU session.

In one embodiment, when determining the first SMF that currently serves the MBS session corresponding to the MBS information according to the MBS information, the querying device is configured to:

send a fourth request message including the MBS information to an NRF to query the NRF for the first SMF that currently serves the MBS session corresponding to the MBS information;

receive the information of the first SMF sent by the NRF.

In one embodiment, the fourth request message further includes first information that includes some or all of:

network slice information, a data network name, a public land mobile network identifier, service area information.

In one embodiment, if the first SMF that currently serves the MBS session corresponding to the MBS information does not exist, the querying device is further configured to:

send a fourth request message including the MBS information to an NRF, and send the MBS information to a third SMF according to information of the third SMF provided by the NRF, so that the third SMF handles the UE joining into the MBS session; wherein the third SMF has an MBS capability.

In one embodiment, the network device is the AMF;

when sending the MBS information to the first SMF according to the information of the first SMF sent by the NRF, the processing device is configured to:

send the MBS information to the first SMF according to the information of the first SMF if a service area of the first SMF includes an area where the UE is located; or send the information of the first SMF and the MBS information to an intermediate SMF if a service area of the first SMF does not include an area where the UE is located, so that the intermediate SMF sends the MBS information to the first SMF, wherein a service area of the intermediate SMF includes the area where the UE is located.

In one embodiment, the network device is a second SMF;

when sending the MBS information to the first SMF, the processing device is configured to:

send the information of the first SMF and the MBS information to an AMF, so that the AMF sends the MBS information to the first SMF.

In one embodiment, the MBS information includes some or all of:

an MBS multicast address, a temporary mobile group identity, an MBS session identifier.

Some embodiments of the present application further provide an apparatus for joining an MBS session, which is applied to an NRF and includes:

a receiving device, configured to receive MBS information sent by a network device;

a querying device, configured to determine a first SMF according to the MBS information and stored SMF information, wherein the first SMF is an SMF that currently serves an MBS session corresponding to the MBS information;

a sending device, configured to provide information of the first SMF to the network device, so that the network device handles a UE joining into the MBS session through interactions with the first SMF.

In one embodiment, the querying device is further configured to:

provide information of a third SMF with an MBS capability to the network device if there is no SMF currently serving the MBS session corresponding to the MBS information, so that the network device handles the UE joining into the MBS session through interactions with the third SMF.

In one embodiment, before the NRF receives the MBS information sent by the network device, the querying device is further configured to:

receive a fifth request message sent by the first SMF, wherein the fifth request message is used to register or update the information of the first SMF, and the information of the first SMF includes information of the MBS session.

Some embodiments of the present application further provide an apparatus for joining an MBS session, which is applied to an SMF and includes:

an update device, configured to register or update information of the SMF with an NRF when configuring or establishing an MBS session, wherein the information of the SMF includes information of the MBS session, so that the NRF provides information of the SMF that currently serves the MBS session to a network device.

In one embodiment, the update device is further configured to:

request the NRF to update the information of the SMF when releasing the MBS session, wherein updating the information of the SMF includes: deleting the information of the MBS session from the information of the SMF.

Some embodiments of the present application further provide an electronic device including a processor and a memory, wherein the memory stores program codes, which cause the processor to perform the steps of any above method for joining the MBS session when executed by the processor.

Some embodiments of the present application further provide a computer readable storage medium including program codes. When the program product runs on an electronic device, the program codes are configured to cause the electronic device to perform the steps of any above method for joining the MBS session.

The present application has the following beneficial effects.

In the methods and apparatuses for joining the MBS session provided in the embodiments of the present application, the network device determines, according to the MBS information sent by the UE, the information of the first SMF that currently serves the MBS session corresponding to the MBS information through the NRF, and the network device then sends the MBS information to the first SMF according to the information of the first SMF, so that the first SMF handles the UE joining into the MBS session. In this way, the network device obtains the SMF that currently serves the MBS session by querying, so that one MBS session is only served by one SMF, avoiding the situation that SMFs serve the same MBS session, and simplifying the MBS session management.

Embodiments of the present application will be described in the following specification, and partly become obvious from the specification or understood by implementing the present application. Embodiments of the present application may be realized and obtained by the structures pointed out in the written specification, claims and drawings.

BRIEF DESCRIPTION OF THE DRAWINGS

The accompanying drawings illustrated here are used to provide further understanding of the present application and constitute a part of the present application. The schematic embodiments of the present application and the illustration thereof are used to explain the present application but not limit the present application improperly. In the accompanying drawings.

DETAILED DESCRIPTION OF THE EMBODIMENTS

The embodiments of the present application will be described clearly and completely below in combination with the accompanying drawings in the embodiments of the present application. The described embodiments are a part of the embodiments of the present application but not all the embodiments. Based upon the embodiments recorded in the present application document.

Figure 1:
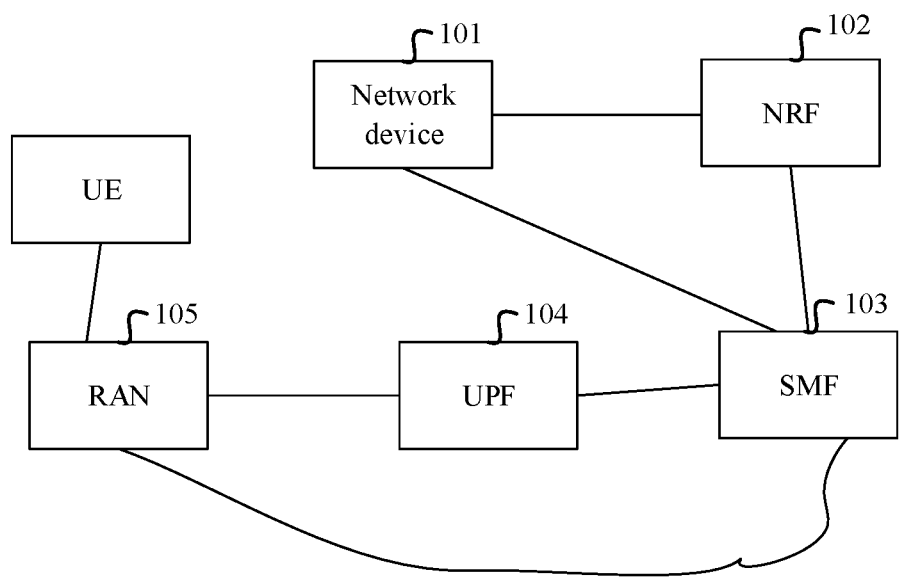
FIG. 1 is an architecture schematic diagram of a mobile communication system in an embodiment of the present application.

Referring to FIG. 1, embodiments of the present application provide a mobile communication system, which at least includes a network device 101, a Network Repository Function (NRF) 102, an SMF 103, a UPF 104, and a Radio Access Network (RAN) 105.

The network device 101 is configured to receive a request message to join an MBS sent by a UE, and query the NRF according to the MBS information carried in the request message to obtain the SMF currently serving an MBS session corresponding to the MBS information.

The NRF 102 is configured to determine the SMF currently serving the MBS session corresponding to the MBS information according to the MBS information sent by the network device 101 and stored SMF information.

The SMF 103 is configured to serve the PDU session and the MBS session of the UE. For example, the SMF 103 sends a Session Management (SM) message to the UPF serving the MBS session through the N4 interface. The SM message includes the updated MBS related information. The related information includes but is not limited to the MBS Quality of Service flow (MBS QoS flow) information, and the information of a tunnel for receiving the MBS data. The SMF 103 sends an SM message to the RAN through the N2 interface, so that the RAN configures the tunnel for receiving the MBS data from the UPF and radio resources for communicating the MBS data with the UE according to the received SM message. The SMF 103 sends an SM message to the UE through the N1 interface, so that the UE determines to start receiving the MBS data according to the SM message.

Figure 2:
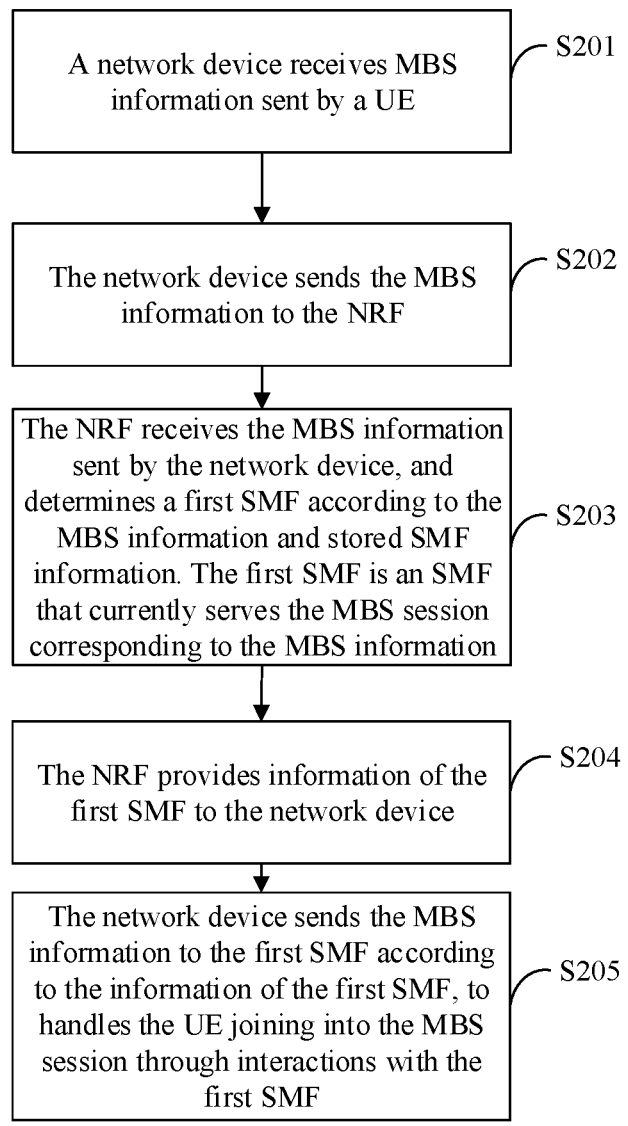
FIG. 2 is a schematic flowchart of joining an MBS session in an embodiment of the present application.

Referring to FIG. 2, embodiments of the present application provide a schematic flowchart of joining an MBS session.

S201: a network device receives MBS information sent by a UE.

The MBS information characterizes the identification information of the MBS session that the UE requests to join. The MBS information in the embodiments of the present application includes some or all of:

an MBS Multicast Address; a Temporary Mobile Group Identity (TMGI) that includes an MBS service identifier; an MBS Session ID.

S202: the network device sends the MBS information to the NRF.

S203: the NRF receives the MBS information sent by the network device, and determines a first SMF according to the MBS information and stored SMF information. The first SMF is an SMF that currently serves the MBS session corresponding to the MBS information.

Here, before step 203 is performed, the SMF registers or updates the information of the SMF with the NRF when establishing the MBS session. The information of the SMF includes the information of the MBS session. Further, the SMF, when releasing the MBS session, requests the NRF to update the information of the SMF. The step of updating the information of the SMF includes: deleting the information of the MBS session from the information of the SMF. In this way, the NRF can determine the SMF that currently serves the MBS session corresponding to the MBS information according to the information of the SMF.

The information of the MBS session characterizes the information that the SMF currently serves the MBS session. In embodiments of the present application, the information of the MBS session may include some or all of: MBS multicast address, TMGI, MBS session identifier.

S204: the NRF provides the information of the first SMF to the network device.

S205: the network device sends the MBS information to the first SMF according to the information of the first SMF, so that the first SMF handles the UE joining into the MBS session.

Among the embodiments of the present application, three embodiments, describing the process of joining the MBS session by the UE, are provided for the scenarios in which the UE requests to establish a PDU session and has established a PDU session when the UE initiates a request message to join the MBS.

Embodiment 1: When the UE requests to establish a PDU session, the AMF selects the SMF serving the PDU session and the MBS session.

Figure 3:
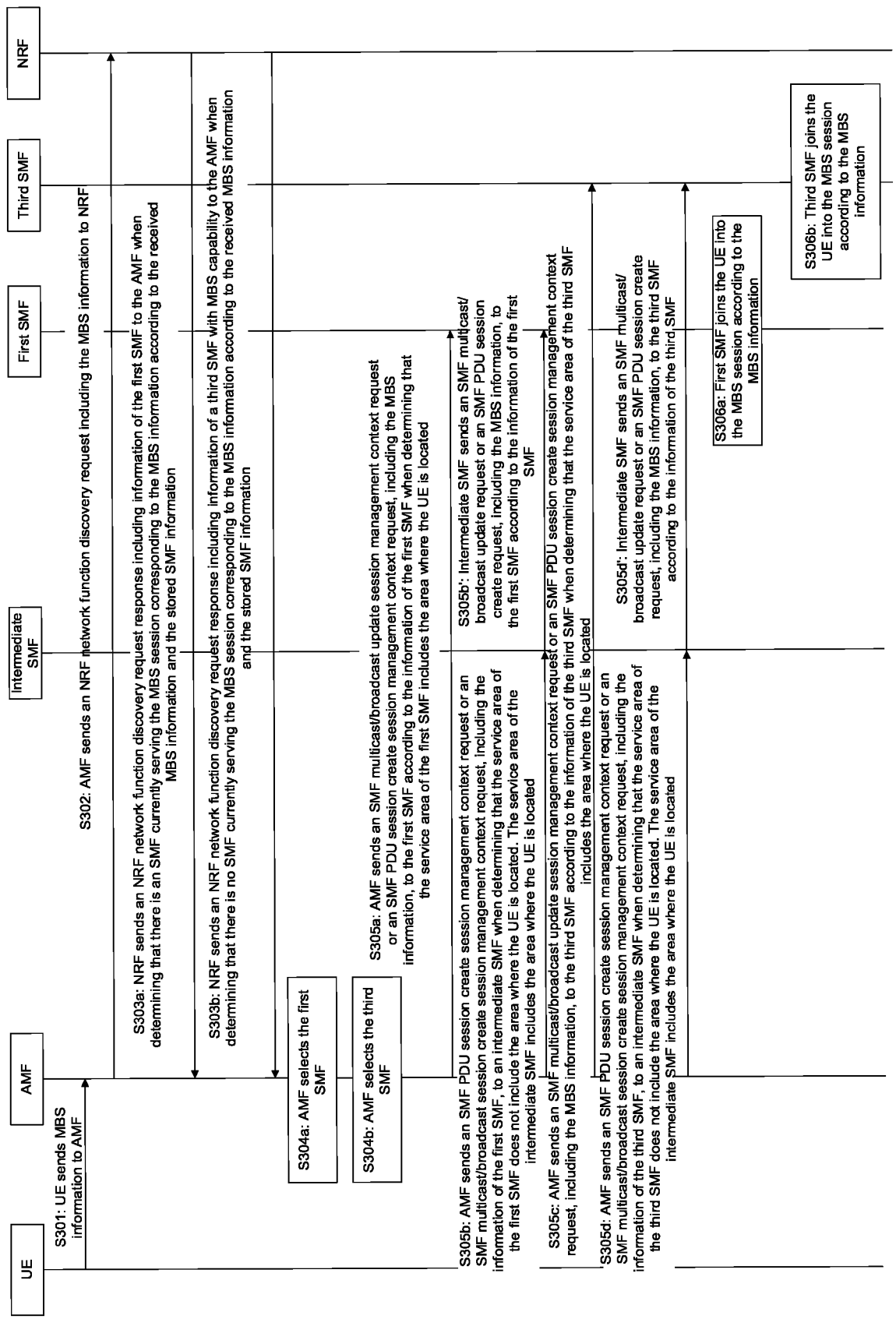
FIG. 3 is a schematic flowchart of Embodiment 1 in the embodiments of the present application.

Referring to FIG. 3, a schematic flowchart of Embodiment 1 is provided.

S301: the UE sends an uplink non-access stratum transport message carrying the MBS information to the AMF.

For example, the UE sends an Uplink Non-Access Stratum Transport (UL NAS Transport) message to the AMF, and the UL NAS Transport message carries the MBS information and an SM message. The SM message here includes a PDU session establishment request. The MBS information characterizes the identification information of the MBS session that the UE requests to join. The MBS information is provided by the MBS Content Provider (CP) or Application Server (AS) to the UE. The MBS information may be some or all of: MBS multicast address, TMGI, MBS session identifier.

S302: the AMF sends an NRF network function discovery request including the MBS information to the NRF.

For example, the AMF initiates an NRF network function discovery request (Nnrf_NFDiscovery_Request) to the NRF. The Nnrf_NFDiscovery_Request is used to query the first SMF that currently serves the MBS session corresponding to the MBS information. The Nnrf_NFDiscovery_Request carries the NF type and the MBS information provided by the UE. In addition, the Nnrf_NFDiscovery_Request can also carry the MBS capability indication information and the first information. The MBS capability indication information is used to request the SMF with the MBS capability, and the first information is used to limit the service scope of the requested SMF. The first information includes some or all of: network slice information, Data Network Name (DNN), Public Land Mobile Network ID (PLMN ID), and service area information.

The network slice information includes a Single Network Slice Selects Auxiliary Information (S-NSSAI) and Network Slice Instance ID (NSI). The service area information includes a Tracking Area Identifier (TAI) and a TAI List (that is, the TAIs). In this way, it can be ensured that only one SMF is used to provide services for the MBS session of a specific MBS within the service range specified above, while other SMFs can provide services for the MBS session of the specific MBS outside the service range, to avoid the situation where an SMF is difficult to manage the MBS session in all ranges due to limitation on its own service area or too great load.

S303a: the NRF sends an NRF network function discovery request response including the information of the first SMF to the AMF when determining that there is an SMF currently serving the MBS session corresponding to the MBS information according to the received MBS information and the stored SMF information.

Before step 303a is performed, the SMF initiates the NRF network function management registration (Nnrf_NFManagement_NFRegister) containing the information of the registered SMF or the NRF network function management information update (Nnrf_NFManagement_NFUpdate) containing the information of the updated SMF to the NRF when establishing the MBS session. The information of the SMF includes the information of the MBS session. The SMF initiates Nnrf_NFManagement_NFUpdate containing the information of the updated SMF to the NRF when releasing the MBS session. The step of updating the information of the SMF includes: deleting the information of the MBS session from the information of the SMF. In this way, the NRF can determine the SMF that currently serves the MBS session corresponding to the MBS information according to the information of the SMF. The SMF can obtain the information of the MBS session in any of the following ways.

(1) The MBS information is provided by the CP or AS of the MBS to the UE. Then the MBS information is provided by the UE to the SMF when the UE initiates a first request message to join the MBS session.

(2) The MBS information is directly configured by the CP or AS for the SMF, or is configured by the CP or AS for the SMF through Network Exposure Function (NEF).

(3) The CP or AS sends the MBS information to the MBS control plane function entity, and then the MBS control plane function entity configures the information of the MBS session to the SMF. The MBS control plane function entity may be MBS Function (MBSF) or MBS Function-Control Plane (MSF-C).

In addition, the information of the SMF may also include the identification information of the SMF, the network slice information served by the SMF, the DNN and the service area information. The identification information may include SMF ID, SMF FQDN, IP Address and PLMN ID. The network slice information served by the SMF may include S-NSSAI and NSI. The service area information may include TAI and TAI List.

When step 303a is executed, the NRF matches the MBS information sent by the AMF with the information of the MBS session in the information of the SMF, and determines the matched SMF as the first SMF.

In one embodiment, the NRF matches the MBS information, the MBS capability indication information and the first information sent by the AMF with the information of the SMF, and determines the matched SMF as the first SMF.

Then, the NRF obtains the information of the first SMF. The information of the first SMF includes the identification information of the SMF, and may also include the information of the MBS session currently served by the SMF.

Finally, the NRF sends an Nnrf_NFDiscovery_Request response containing the information of the first SMF to the AMF.

S303b: the NRF sends an NRF network function discovery request (Nnrf_NFDiscovery_Request) response including the information of a third SMF with MBS capability to the AMF when determining that there is no SMF currently serving the MBS session corresponding to the MBS information according to the received MBS information and the stored SMF information.

Before step 303b is performed, the SMF registers or updates the information of the SMF with the NRF when establishing the MBS session. The information of the SMF includes the information of the MBS session. The SMF requests the NRF to update the information of the SMF when releasing the MBS session, where the step of updating the information of the SMF includes: deleting the information of the MBS session from the information of the SMF. The specific operation method has been described above and will not be repeated here.

When performing step 303b, the NRF needs to screen out all the third SMFs with MBS capability from the registered SMFs, so the number of third SMFs may be one or more. The information of the third SMF includes at least the identification information of the SMF and the information indicating that the SMF has the MBS capability.

S304a: the AMF selects the first SMF.

Currently, there is only one SMF serving the MBS session, so the AMF directly selects the first SMF and performs the subsequent operation that the UE joins the MBS session.

S304b: the AMF selects a third SMF.

When step 304b is performed, if the NRF only provides the information of one third SMF, the AMF can directly select the third SMF; if the NRF provides the information of multiple third SMFs, the AMF can select a third SMF according to a preset local strategy.

Then, the selected third SMF may update information to the NRF, to add the information of the MBS session to the information of the third SMF. The specific adding method has been described above and will not be repeated here.

S305a: the AMF sends an SMF multicast/broadcast update session management context request or an SMF PDU session create session management context request, including the MBS information, to the first SMF according to the information of the first SMF when determining that the service area of the first SMF includes the area where the UE is located.

In step 305a, the AMF sends the SMF multicast/broadcast update session management context (Nsmf_MBSSession_UpdateSMContext) request or SMF PDU session create session management context (Nsmf_PDUSession_CreateSMContext) request to the first SMF. The Nsmf_MBSSession_UpdateSMContext request or Nsmf_PDUSession_CreateSMContext request carries the identification information of the UE, the MBS information and other information for the UE to join into the MBS session.

S305b: the AMF sends an SMF PDU session create session management context (Nsmf_PDUSession_CreateSMContext) request or an SMF multicast/broadcast session create session management context (Nsmf_MBSSession_CreateSMContext) request, including the information of the first SMF, to an intermediate SMF when determining that the service area of the first SMF does not include the area where the UE is located. The service area of the intermediate SMF includes the area where the UE is located.

When the service area of the first SMF does not include the area where the UE is located, the AMF cannot directly access the first SMF, and the AMF can transmit the MBS information to the first SMF through an intermediate SMF with the MBS capability. The service area of the intermediate SMF includes the area where the UE is located. The Nsmf_PDUSession_CreateSMContext request or Nsmf_MBSSession_CreateSMContext request carries the identification information of the UE, the MBS information and other information for the UE to join into the MBS session.

The AMF may select a SMF with the MBS capability from the locally configured SMFs as the intermediate SMF; or may query the NRF for a SMF that can serve the area where the UE is located and has the MBS capability as the intermediate SMF. Then, the intermediate SMF needs to update information to the NRF, to add the information of the MBS session to the information of the intermediate SMF. The specific adding method has been described above and will not be repeated here.

S305b': the intermediate SMF sends an SMF multicast/broadcast update request or an SMF PDU session create request including the MBS information to the first SMF according to the information of the first SMF.

The intermediate SMF sends an SMF multicast/broadcast update (Nsmf_MBSSession_Update) request or an SMF PDU session create (Nsmf_PDUSession_Create) request to the first SMF.

S305c: the AMF sends an SMF multicast/broadcast update session management context (Nsmf_MBSSession_UpdateSMContext) request or an SMF PDU session create session management context (Nsmf_PDUSession_CreateSMContext) request, including the MBS information, to the third SMF according to the information of the third SMF when determining that the service area of the third SMF includes the area where the UE is located.

S305d: the AMF sends an SMF PDU session create session management context (Nsmf_PDUSession_CreateSMContext) request or an SMF multicast/broadcast session create session management context (Nsmf_MBSSession_CreateSMContext) request, including the information of the third SMF, to an intermediate SMF when determining that the service area of the third SMF does not include the area where the UE is located. The service area of the intermediate SMF includes the area where the UE is located.

S305d': the intermediate SMF sends an SMF multicast/broadcast update (Nsmf_MBSSession_Update) request or an SMF PDU session create (Nsmf_PDUSession_Create) request, including the MBS information, to the third SMF according to the information of the third SMF.

S306a: the first SMF handles the UE joining into the MBS session according to the MBS information.

For example, the first SMF sends an SM message to the UPF serving the MBS session through the N4 interface. The SM message includes the updated MBS related information. The related information includes but is not limited to the MBS QoS flow information, and the information of a tunnel for receiving the MBS data. The first SMF sends an SM message to the RAN through the N2 interface, so that the RAN configures the tunnel for receiving the MBS data from the UPF and radio resources for communicating the MBS data with the UE according to the received SM message. The first SMF sends an SM message to the UE through the N1 interface, so that the UE determines to start receiving the MBS data according to the SM message.

After the first SMF releases the MBS session, there is a need to update information to the NRF, to delete the information of the MBS session from the information of the first SMF.

S306b: the third SMF handles the UE joining into the MBS session according to the MBS information.

For example, the third SMF sends an SM message to the UPF serving the MBS session through the N4 interface. The SM message includes the updated MBS related information. The related information includes but is not limited to the MBS QoS flow information, and the information of a tunnel for receiving the MBS data. The third SMF sends an SM message to the RAN through the N2 interface, so that the RAN configures the tunnel for receiving the MBS data from the UPF and radio resources for communicating the MBS data with the UE according to the received SM message. The third SMF sends an SM message to the UE through the N1 interface, so that the UE determines to start receiving the MBS data according to the SM message.

After the third SMF releases the MBS session, there is a need to update information to the NRF, to delete the information of the MBS session from the information of the third SMF.

Embodiment 2: When the UE has established a PDU session, the AMF selects the SMF serving the MBS session.

Figure 4:
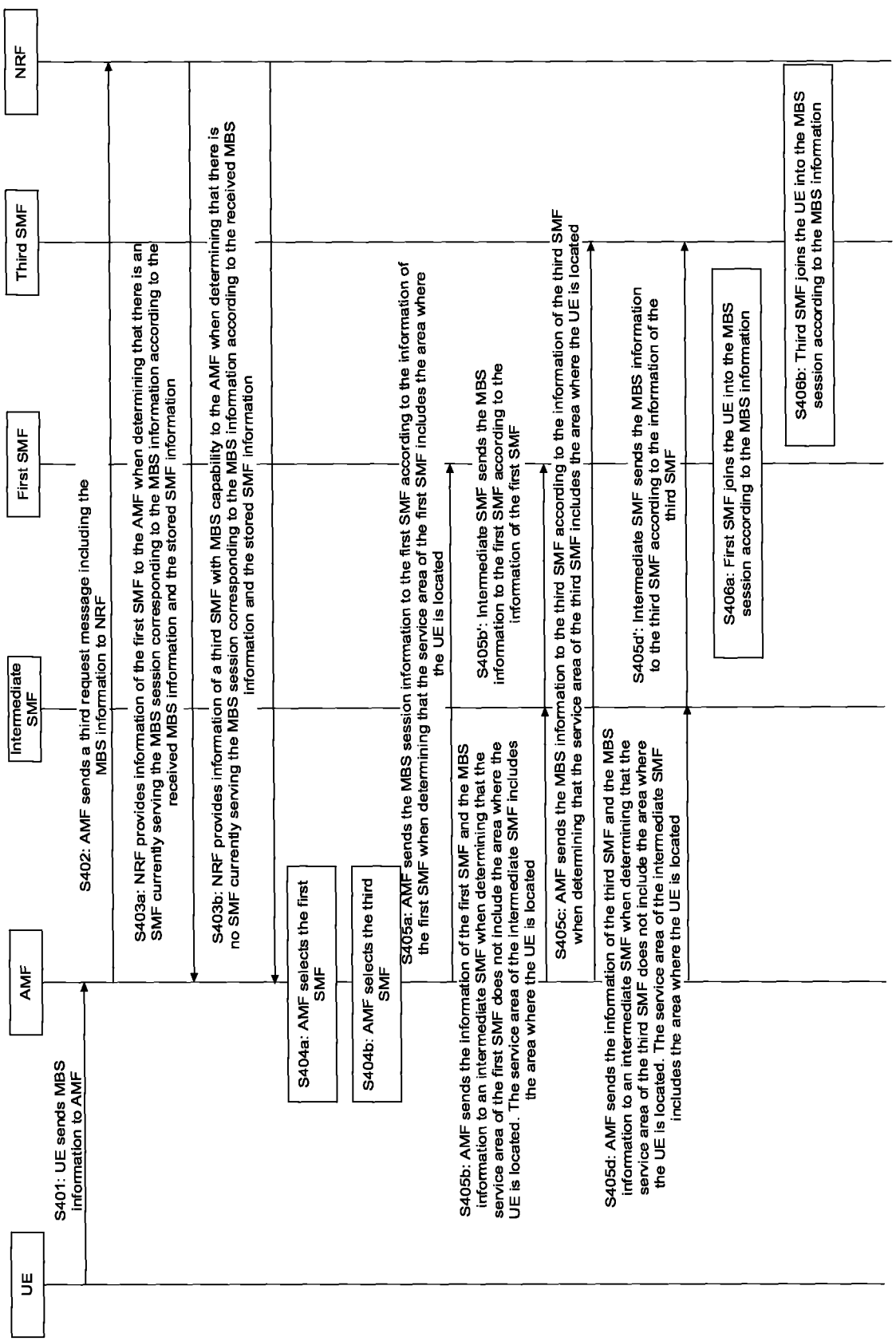
FIG. 4 is a schematic flowchart of Embodiment 2 in the embodiments of the present application.

Referring to FIG. 4, a schematic flowchart of Embodiment 2 is provided.

S401: the UE sends a UL NAS Transport message carrying the MBS information to the AMF.

The UE can send the request information containing the MBS information to the AMF in any of the following ways.

In a first manner: the UE sends an Uplink Non-Access Stratum (UL NAS Transport) message to the AMF. The UL NAS Transport message carries the MBS information and an SM message that includes a PDU session modification request.

In a second manner: the UE sends a multicast join message to the UPF by using the user plane of the established PDU session. The multicast join message carries the MBS information. The UPF then sends a notification to a second SMF serving the PDU session. The notification carries the identification information of the UE and the MBS information. The second SMF initiates an AMF communication reroute (Namf_Communication_Reroute) request or an SMF PDU session update (Nsmf_PDUSession_Update) request to the AMF. The Namf_Communication_Reroute request or Nsmf_PDUSession_Update request carries the identification information of the UE and the MBS information.

S402: the AMF sends an Nnrf_NFDiscovery_Request including the MBS information to the NRF.

S403a: the NRF sends an Nnrf_NFDiscovery_Request response including the information of the first SMF to the AMF when determining that there is an SMF currently serving the MBS session corresponding to the MBS information according to the received MBS information and the stored SMF information.

S403b: the NRF sends an Nnrf_NFDiscovery_Request response including the information of a third SMF with MBS capability to the AMF when determining that there is no SMF currently serving the MBS session corresponding to the MBS information according to the received MBS information and the stored SMF information.

Before step 403a or step 403b is performed, the SMF registers or updates the information of the SMF with the NRF when establishing the MBS session. The information of the SMF includes the information of the MBS session. The SMF requests the NRF to update the information of the SMF when releasing the MBS session, where the step of updating the information of the SMF includes: deleting the information of the MBS session from the information of the SMF. The specific operation method has been described above and will not be repeated here.

S404a: the AMF selects the first SMF.

S404b: the AMF selects a third SMF.

When step 404b is performed, if the NRF only provides the information of one third SMF, the AMF can directly select the third SMF; if the NRF provides the information of multiple third SMFs, the AMF can select a third SMF according to a preset local strategy. If the second SMF serving the PDU session also has the MBS capability, the AMF may preferentially select the second SMF.

Then, the selected third (or second) SMF updates information to the NRF, to add the information of the MBS session to the information of the third (or second) SMF.

S405a: the AMF sends an Nsmf_MBSSession_UpdateSMContext request or an Nsmf_PDUSession_CreateSMContext request, including the MBS information, to the first SMF according to the information of the first SMF when determining that the service area of the first SMF includes the area where the UE is located. The second SMF releases the PDU session.

If the first SMF selected by the AMF is not the second SMF serving the PDU session, the AMF sends the Nsmf_PDUSession_UpdateSMContext or Nsmf_PDUSession_ReleaseSMContext, carrying the identifier of the PDU session to the second SMF. After the second SMF transfers all the relevant parameters of the PDU session to the first SMF, the second SMF releases the PDU session. That is, the second SMF deletes the context of the PDU session. The first SMF serves the PDU session and the MBS session at the same time.

S405b: the AMF sends an Nsmf_PDUSession_CreateSMContext request or an Nsmf_MBSSession_CreateSMContext request, including the information of the first SMF, to an intermediate SMF when determining that the service area of the first SMF does not include the area where the UE is located. The service area of the intermediate SMF includes the area where the UE is located.

The AMF may select a SMF with the MBS capability from the locally configured SMFs as the intermediate SMF; or may query the NRF for an SMF that can serve the area where the UE is located and has the MBS capability as the intermediate SMF; or may use the second SMF with the MBS capability as the intermediate SMF. Then, the intermediate SMF may update information to the NRF, to add the information of the MBS session to the information of the intermediate SMF.

S405b': the intermediate SMF sends an Nsmf_MBSSession_Update request or an Nsmf_PDUSession_Create request including the MBS information to the first SMF according to the information of the first SMF.

S405c: the AMF sends an Nsmf_MBSSession_UpdateSMContext request or an Nsmf_PDUSession_CreateSMContext request including the MBS information to the third SMF according to the information of the third SMF when determining that the service area of the third SMF includes the area where the UE is located.

S405d: the AMF sends an Nsmf_PDUSession_CreateSMContext request or an Nsmf_MBSSession_CreateSMContext request including the information of the third SMF to an intermediate SMF when determining that the service area of the third SMF does not include the area where the UE is located. The service area of the intermediate SMF includes the area where the UE is located.

If the intermediate SMF selected by the AMF is the second SMF serving the PDU session, the AMF initiates an Nsmf_PDUSession_UpdateSMContext request or an Nsmf_MBSSession_CreateSMContext request to the second SMF. Both of two above-mentioned requests carry the identification information of the UE, the MBS information, the information of the first SMF and other information.

S405d': the intermediate SMF sends an Nsmf_MBSSession_Update request or an Nsmf_PDUSession_Create request including the MBS information to the third SMF according to the information of the third SMF.

If the intermediate SMF selected by the AMF is the second SMF serving the PDU session, the second SMF sends an Nsmf_MBSSession_Update request or an Nsmf_PDUSession_Create request to the first SMF. Both of two above-mentioned requests carry the identification information of the UE, the MBS information and other information.

S406a: the first SMF handles the UE joining into the MBS session according to the MBS information.

S406b: the third SMF handles the UE joining into the MBS session according to the MBS information.

The process of the UE joining into the MBS session has been described in the Embodiment 1, and will not be repeated here.

Embodiment 3: When the UE has established a PDU session, the second SMF selects the SMF serving the MBS session.

Figure 5:
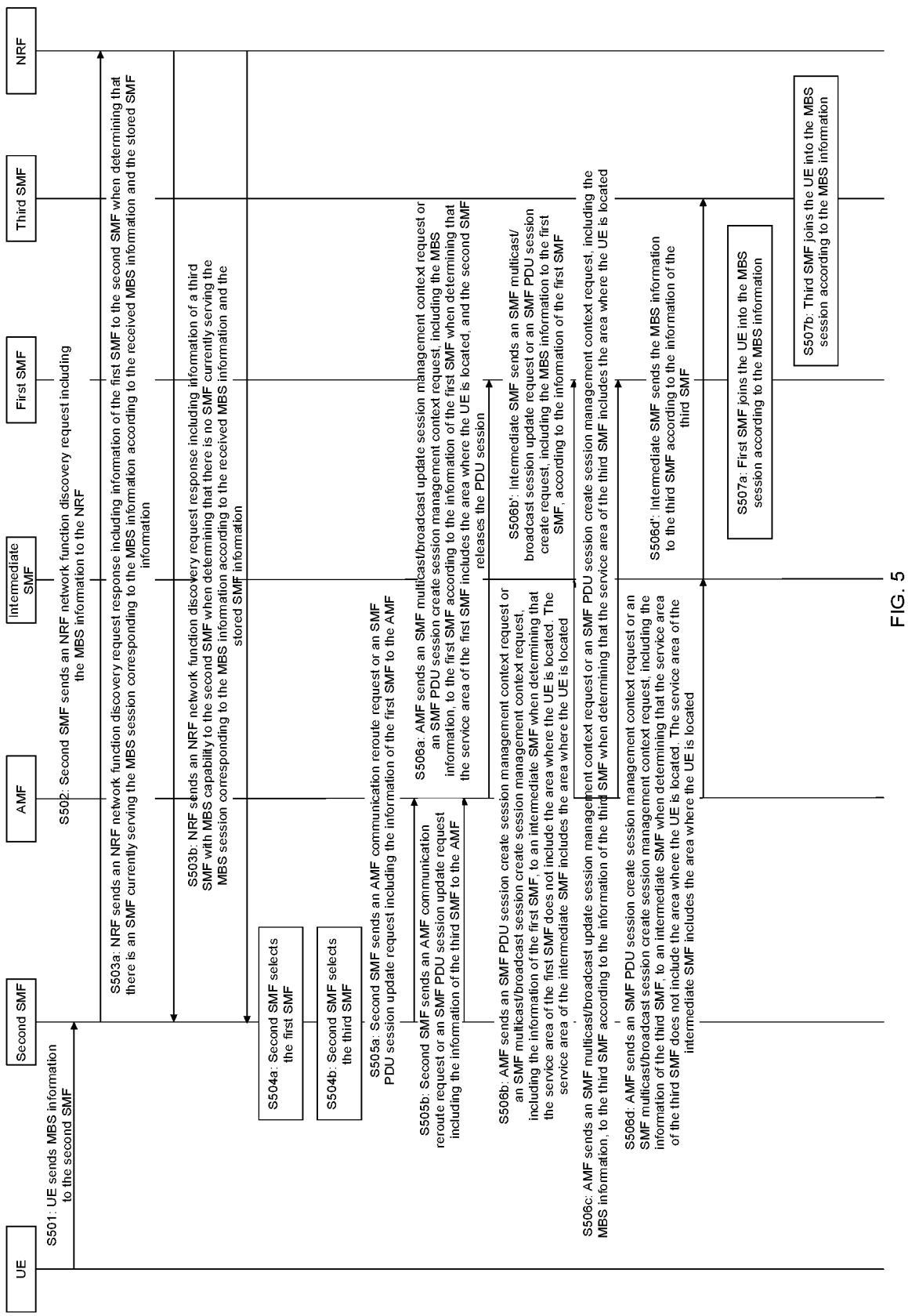
FIG. 5 is a schematic flowchart of Embodiment 3 in the embodiments of the present application.

Referring to FIG. 5, a schematic flowchart of Embodiment 3 is provided.

S501: the UE sends the MBS information to the second SMF.

The UE sends a multicast join message to the UPF by using the user plane of the established PDU session. The multicast join message carries the MBS information. The UPF then sends a notification to a second SMF serving the PDU session. The notification carries the identification information of the UE and the MBS information.

S502: the second SMF sends an NRF network function discovery request (Nnrf_NFDiscovery_Request) including the MBS information to the NRF.

S503a: the NRF sends an NRF network function discovery request (Nnrf_NFDiscovery_Request) response including the information of the first SMF to the second SMF when determining that there is an SMF currently serving the MBS session corresponding to the MBS information according to the received MBS information and the stored SMF information.

S503b: the NRF sends an NRF network function discovery request (Nnrf_NFDiscovery_Request) response including the information of a third SMF with MBS capability to the second SMF when determining that there is no SMF currently serving the MBS session corresponding to the MBS information according to the received MBS information and the stored SMF information.

Before step 503a or step 503b is performed, the SMF registers or updates the information of the SMF with the NRF when establishing the MBS session. The information of the SMF includes the information of the MBS session. The SMF requests the NRF to update the information of the SMF when releasing the MBS session, where the step of updating the information of the SMF includes: deleting the information of the MBS session from the information of the SMF. The specific operation method has been described above and will not be repeated here.

S504a: the second SMF selects the first SMF.

S504b: the second SMF selects a third SMF.

When step 504b is performed, if the NRF only provides the information of one third SMF, the second SMF can directly select the third SMF; if the NRF provides the information of multiple third SMFs, the second SMF can select a third SMF according to a preset local strategy. If the second SMF itself has the MBS capability, the second SMF preferentially selects itself as the third SMF to serve the MBS session.

Then, the selected third SMF may update information to the NRF, to add the information of the MBS session to the information of the third SMF.

S505a: the second SMF sends an AMF communication reroute (Namf_Communication_Reroute) request or an SMF PDU session update (Nsmf_PDUSession_Update) request including the information of the first SMF to the AMF.

S505b: the second SMF sends an Namf_Communication_Reroute request or an Nsmf_PDUSession_Update request including the information of the third SMF to the AMF.

S506a: the AMF sends an Nsmf_MBSSession_UpdateSMContext request or an Nsmf_PDUSession_CreateSMContext request including the MBS information to the first SMF according to the information of the first SMF when determining that the service area of the first SMF includes the area where the UE is located. The second SMF releases the PDU session.

If the first SMF selected by the second SMF is not the second SMF serving the PDU session, the AMF sends the Nsmf_PDUSession_UpdateSMContext or Nsmf_PDUSession_ReleaseSMContext carrying the identifier of the PDU session to the second SMF. After the second SMF transfers all the relevant parameters of the PDU session to the first SMF, the second SMF releases the PDU session. That is, the second SMF deletes the context of the PDU session. The first SMF serves the PDU session and the MBS session at the same time.

S506b: the AMF sends an Nsmf_PDUSession_CreateSMContext request or an Nsmf_MBSSession_CreateSMContext request including the information of the first SMF to an intermediate SMF when determining that the service area of the first SMF does not include the area where the UE is located. The service area of the intermediate SMF includes the area where the UE is located.

The AMF may select a SMF with the MBS capability from the locally configured SMFs as the intermediate SMF; or may query the NRF for an MBS that can serve the area where the UE is located and has the MBS capability as the intermediate SMF; or may use the second SMF with the MBS capability as the intermediate SMF. Then, the intermediate SMF may update information to the NRF, to add the information of the MBS session to the information of the intermediate SMF.

S506b': the intermediate SMF sends an SMF multicast/broadcast session update (Nsmf_MBSSession_Update) request or an SMF PDU session create (Nsmf_PDUSession_Create) request including the MBS information to the first SMF according to the information of the first SMF.

S506c: the AMF sends an SMF multicast/broadcast update session management context (Nsmf_MBSSession_UpdateSMContext) request or an SMF PDU session create session management context (Nsmf_PDUSession_CreateSMContext) request including the MBS information to the third SMF according to the information of the third SMF when determining that the service area of the third SMF includes the area where the UE is located.

S506d: the AMF sends an Nsmf_PDUSession_CreateSMContext request or an SMF multicast/broadcast session create session management context (Nsmf_MBSSession_CreateSMContext) request including the information of the third SMF to an intermediate SMF when determining that the service area of the third SMF does not include the area where the UE is located. The service area of the intermediate SMF includes the area where the UE is located.

S506d': the intermediate SMF sends the MBS information to the third SMF according to the information of the third SMF.

S507a: the first SMF handles the UE joining into the MBS session according to the MBS information.

S507b: the third SMF handles the UE joining into the MBS session according to the MBS information.

The process of the UE joining into the MBS session has been described in the Embodiment 1, and will not be repeated here.

Figure 6:
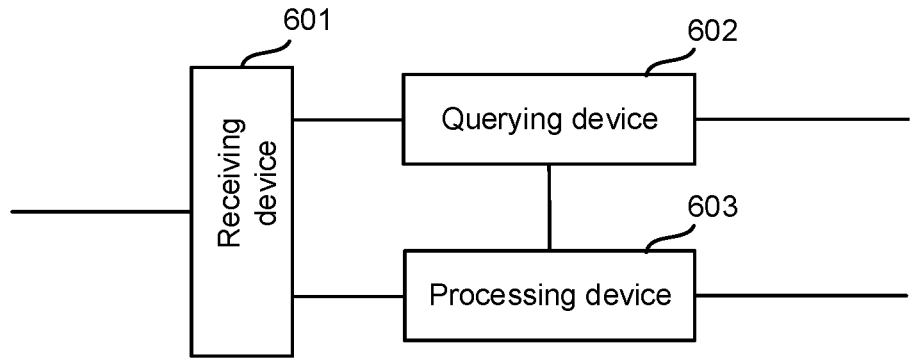
FIG. 6 is a structural schematic diagram of an apparatus for joining an MBS session applied to a network device according to an embodiment of the present application.

Embodiments of the present application provide an apparatus for joining an MBS session, which is applied to a network device. Referring to FIG. 6, the apparatus includes at least a receiving device 601, a querying device 602 and a processing device 603.

The receiving device 601 is configured to receive MBS information sent by a UE.

The querying device 602 is configured to determine information of a first SMF that currently serves an MBS session corresponding to the MBS information according to the MBS information.

The processing device 603 is configured to send the MBS information to the first SMF according to the information of the first SMF, so that the first SMF handles the UE joining into the MBS session.

In one embodiment, the network device is an AMF.

The receiving device 601 is configured to:

receive a first request message including the MBS information sent by the UE; or receive a second request message including the MBS information sent by a second SMF, wherein the second SMF is an SMF serving a PDU session of the UE.

In one embodiment, the network device is a second SMF. The second SMF is an SMF serving a PDU session of the UE.

The receiving device 601 is configured to:

receive a third request message including the MBS information sent by a UPF, wherein the third request message is generated by the UPF based on the MBS information sent by the UE through the PDU session.

In one embodiment, the querying device 602 is further configured to:

send a fourth request message including the MBS information to an NRF to query the NRF for the first SMF that currently serves the MBS session corresponding to the MBS information; and receive the information of the first SMF sent by the NRF entity.

In one embodiment, the fourth request message further includes first information that includes some or all of:

network slice information, a data network name, a public land mobile network identifier, service area information.

In one embodiment, if the first SMF that currently serves the MBS session corresponding to the MBS information does not exist, the querying device 602 is further configured to:

send a fourth request message including the MBS information to an NRF, and send the MBS information to a third SMF according to information of the third SMF provided by the NRF, so that the third SMF handles the UE joining into the MBS session; wherein the third SMF has an MBS capability.

In one embodiment, the network device is the AMF.

The processing device 603 is configured to:

send the MBS information to the first SMF according to the information of the first SMF if a service area of the first SMF includes an area where the UE is located; or send the information of the first SMF and the MBS information to an intermediate SMF if a service area of the first SMF does not include an area where the UE is located, so that the intermediate SMF sends the MBS information to the first SMF according to the information of the first SMF, wherein a service area of the intermediate SMF includes the area where the UE is located.

In one embodiment, the network device is a second SMF.

The processing device 603 is configured to:

send the information of the first SMF and the MBS information to the AMF, so that the AMF sends the MBS information to the first SMF according to the information of the first SMF.

In one embodiment, the MBS information includes some or all of:

an MBS multicast address, a temporary mobile group identity, an MBS session identifier.

Figure 7:
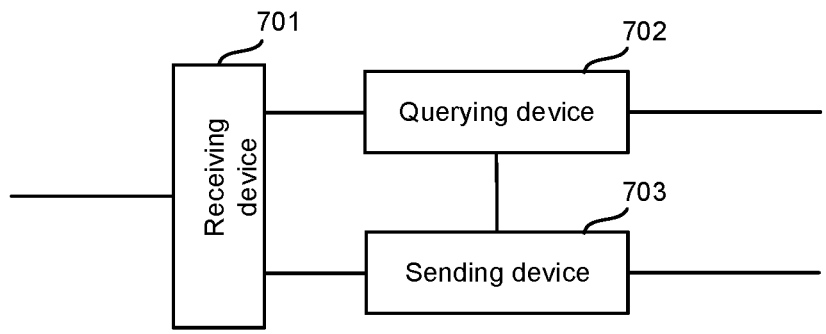
FIG. 7 is a structural schematic diagram of an apparatus for joining an MBS session applied to the NRF according to an embodiment of the present application.

Embodiments of the present application provide an apparatus for joining an MBS session, which is applied to an NRF. Referring to FIG. 7, the apparatus includes at least a receiving device 701, a querying device 702 and a sending device 703.

The receiving device 701 is configured to receive MBS information sent by a network device.

The querying device 702 is configured to determine a first SMF according to the MBS information and stored SMF information, wherein the first SMF is an SMF that currently serves an MBS session corresponding to the MBS information.

The sending device 703 is configured to provide information of the first SMF to the network device, so that the network device handles a UE joining into the MBS session through interactions with the first SMF.

In one embodiment, the querying device 702 is further configured to:

provide information of a third SMF with an MBS capability to the network device if there is no SMF currently serving the MBS session corresponding to the MBS information, so that the network device handles the UE joining into the MBS session through interactions with the third SMF.

In one embodiment, the querying device 702 is further configured to:

receive a fifth request message sent by the first SMF, wherein the fifth request message is used to register or update the information of the first SMF, and the information of the first SMF includes information of the MBS session.

Figure 8:
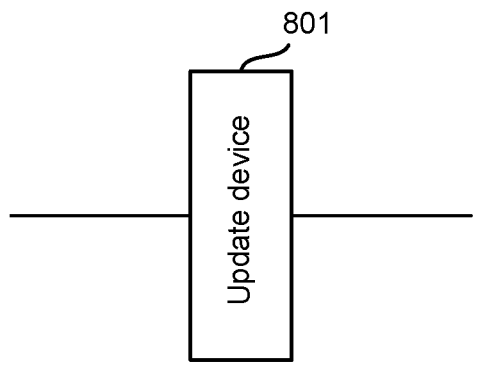
FIG. 8 is a structural schematic diagram of an apparatus for joining an MBS session applied to the SMF according to an embodiment of the present application.

Embodiments of the present application provide an apparatus for joining an MBS session, which is applied to an SMF. Referring to FIG. 8, the apparatus includes at least an update device 801.

The update device 801 is configured to register or update information of the SMF with an NRF when establishing an MBS session, wherein the information of the SMF includes information of the MBS session, so that the NRF provides information of the SMF that currently serves the MBS session to a network device.

In one embodiment, the update device 801 is further configured to:

request the NRF to update the information of the SMF when releasing the MBS session, wherein updating the information of the SMF includes: deleting the information of the MBS session from the information of the SMF.

Figure 9:
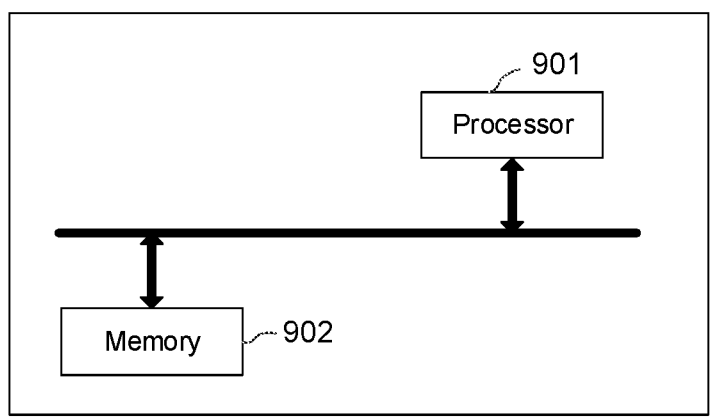
FIG. 9 is a structural schematic diagram of an electronic device in an embodiment of the present application.

Embodiments of the present application provide an electronic device, as shown in FIG. 9, at least including a processor 901 and a memory 902, wherein the memory 902 stores program codes, which cause the processor 901 to perform the steps of any above method for joining the MBS session when executed by the processor.

Embodiments of the present application provide a computer readable storage medium including program codes. When the program product runs on an electronic device, the program codes are configured to cause the electronic device to perform the steps of any above method for joining the MBS session.

In some possible embodiments, various aspects of the service control method provided by the present application may also be implemented in the form of a program product, which includes program codes. When the program product runs on a computer device, the program codes are configured to cause the electronic device to perform the steps in the method for joining the MBS session according to various exemplary embodiments of the present application described above in this specification.

The program product may use any combination of one or more readable media. The readable medium may be a readable signal medium or a readable storage medium. The readable storage medium may be, for example but not limited to, electrical, magnetic, optical, electromagnetic, infrared, or semiconductor system, apparatus or device, or any combination thereof. More specific examples of the readable storage media (non-exhaustive list) include: electrical connection with one or more wires, portable disk, hard disk, Random Access Memory (RAM), Read Only Memory (ROM), Erasable Programmable Read Only Memory (EPROM) or flash memory, optical fiber, portable Compact Disk-Read Only Memory (CD-ROM), optical storage device, magnetic storage device, or any suitable combination thereof.

The program product for service control in the embodiment of the present application may adopt a portable Compact Disk-Read Only Memory (CD-ROM) and include program codes, and may be run on a computing device. However, the program product of the present application is not limited to this. In this document, the readable storage medium can be any tangible medium that contains or stores a program, where the program can be used by or used in combination with a command execution system, apparatus or device.

The readable signal medium may include data signals propagated in the baseband or as a part of carrier waves, and the readable program codes are stored therein. Such propagated data signals can be in many forms, including but not limited to electromagnetic signals, optical signals, or any suitable combination thereof. The readable signal medium may also be any readable medium other than the readable storage medium, and the readable medium may send, propagate or transmit the programs used by or used in combination with a command execution system, apparatus or device.

The program codes contained on the readable medium can be transmitted by any suitable medium, including but not limited to wireless, wired, optical cable, RF, etc., or any suitable combination thereof.

The program codes for performing the operations of the present application can be compiled in any combination of one or more programming languages, where the programming languages include the object-oriented programming languages such as Java, C++, etc., and also include the conventional procedural programming languages such as "C" language or similar programming languages. The program codes can be executed entirely on a user computing device, executed partly on a user computing device, executed as an independent software package, executed partly on a user computing device and partly on a remote computing device, or executed entirely on a remote computing device or server. In the case of a remote computing device, the remote computing device can be connected to the user computing device through any kind of network including Local Area Network (LAN) or Wide Area Network (WAN), or can be connected to an external computing device (for example, using the Internet service provider to connect via the Internet).

What is claimed is:

1. A method for joining a Multicast Broadcast Service, MBS, session, performed by a network device, wherein the method comprises:

receiving, by the network device, MBS information sent by a User Equipment, UE;

determining according to the MBS information, by the network device, information of a first Session Management Function, SMF, that currently serves an MBS session corresponding to the MBS information; and sending, by the network device, the MBS information to the first SMF according to the information of the first SMF, so that the first SMF handles the UE joining into the MBS session;

wherein the MBS information comprises some or all of: an MBS multicast address, a temporary mobile group identity, an MBS session identifier.

2. The method of claim 1, wherein:

the network device is an Access and Mobility Management Function, AMF; and said receiving, by the network device, the MBS information sent by the UE, comprises:

receiving, by the AMF, a first request message including the MBS information sent by the UE; or receiving, by the AMF, a second request message including the MBS information sent by a second SMF, wherein the second SMF is an SMF serving a Protocol Data Unit, PDU, session of the UE.

3. The method of claim 1, wherein:
the network device is a second SMF,
wherein the second SMF is an SMF serving a PDU session of the UE; and
said receiving, by the network device, the MBS information sent by the UE, comprises:
receiving, by the second SMF, the MBS information sent by the UE; or
receiving, by the second SMF, a third request message including the MBS information sent by a User Plane Function, UPF, wherein the third request message is generated by the UPF based on the MBS information sent by the UE through the PDU session.

4. The method of claim 1, wherein said determining according to the MBS information, by the network device, information of the first SMF that currently serves the MBS session corresponding to the MBS information, comprises:
sending, by the network device, a fourth request message including the MBS information to a Network Repository Function, NRF, to query the NRF for the information of the first SMF that currently serves the MBS session corresponding to the MBS information;
receiving, by the network device, the information of the first SMF sent by the NRF.

5. The method of claim 4, wherein the fourth request message comprises first information comprising some or all of:
network slice information, a data network name, a public land mobile network identifier, service area information.

6. The method of claim 1, wherein if the first SMF that currently serves the MBS session corresponding to the MBS information does not exist, the method further comprises:
sending, by the network device, a fourth request message including the MBS information to an NRF; and
sending, by the network device, the MBS information to a third SMF according to information of the third SMF provided by the NRF, so that the third SMF handles the UE joining into the MBS session;
wherein the third SMF has an MBS capability.

7. The method of claim 1, wherein:
the network device is the AMF; and
said sending, by the network device, the MBS information to the first SMF according to the information of the first SMF, comprises:
sending, by the AMF, the MBS information to the first SMF according to the information of the first SMF when a service area of the first SMF comprises an area where the UE is located; or
sending, by the AMF, the information of the first SMF and the MBS information to an intermediate SMF when a service area of the first SMF does not comprise an area where the UE is located, so that the intermediate SMF sends the MBS information to the first SMF;
wherein a service area of the intermediate SMF comprises the area where the UE is located.

8. The method of claim 1, wherein:
the network device is a second SMF; and
said sending, by the network device, the MBS information to the first SMF, comprises:
sending, by the second SMF, the information of the first SMF and the MBS information to an AMF, so that the AMF sends the MBS information to the first SMF.

9. A method for joining a Multicast Broadcast Service, MBS, session, performed by a Network Repository Function, NRF, wherein the method comprises:
receiving, by the NRF, MBS information sent by a network device;
determining, by the NRF, a first SMF according to the MBS information and stored SMF information, wherein the first SMF is an SMF that currently serves an MBS session corresponding to the MBS information; and
providing, by the NRF, information of the first SMF to the network device, so that the network device handles a User Equipment, UE, joining into the MBS session through interactions with the first SMF;
wherein the MBS information comprises some or all of:
an MBS multicast address, a temporary mobile group identity, an MBS session identifier.

10. The method of claim 9, further comprising:
providing, by the NRF, information of a third SMF with an MBS capability to the network device when there is no SMF currently serving the MBS session corresponding to the MBS information, so that the network device handles the UE joining into the MBS session through interactions with the third SMF.

11. The method of claim 9, wherein before the NRF receives the MBS information sent by the network device, the method further comprises:
receiving, by the NRF, a fifth request message sent by the first SMF;
wherein the fifth request message is used to register or update the information of the first SMF, and the information of the first SMF comprises information of the MBS session.

12. A method for joining a Multicast Broadcast Service, MBS, session, performed by a Session Management Function, SMF, wherein the method comprises:
registering or updating, by the SMF, information of the SMF with a Network Repository Function, NRF, when configuring or establishing an MBS session;
wherein the information of the SMF comprises information of the MBS session, so that the NRF provides the information of the SMF that currently serves the MBS session to a network device;
wherein the information of the MBS session comprises some or all of:
an MBS multicast address, a temporary mobile group identity, an MBS session identifier.

13. The method of claim 12, further comprising:
requesting, by the SMF, the NRF to update the information of the SMF when releasing the MBS session;
wherein the information of the SMF is updated by: deleting the information of the MBS session from the information of the SMF.

14. An electronic device comprising a processor and a memory, wherein the memory stores program codes, which cause the processor to perform steps of the method of claim 1 when executed by the processor.

15. A non-transitory computer readable storage medium comprising program codes, which are configured to cause an electronic device to perform steps of the method of claim 1 when the program codes run on the electronic device.

16. An electronic device comprising a processor and a memory, wherein the memory stores program codes, which cause the processor to perform steps of the method of claim 9 when executed by the processor.

17. An electronic device comprising a processor and a memory, wherein the memory stores program codes, which cause the processor to perform steps of the method of claim 12 when executed by the processor.

18. A non-transitory computer readable storage medium comprising program codes, which are configured to cause an electronic device to perform steps of the method of claim 9 when the program codes run on the electronic device.

\* \* \* \* \*